(12) United States Patent
Kotlarski

(10) Patent No.: US 6,523,218 B1
(45) Date of Patent: Feb. 25, 2003

(54) WIPER BLADE FOR WINDOW PANES OF MOTOR VEHICLES

(75) Inventor: Thomas Kotlarski, Bad Neuenahr (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/601,747

(22) PCT Filed: Sep. 19, 1999

(86) PCT No.: PCT/DE99/03015

§ 371 (c)(1),
(2), (4) Date: Sep. 15, 2000

(87) PCT Pub. No.: WO00/34090

PCT Pub. Date: Jun. 15, 2000

(30) Foreign Application Priority Data

Dec. 7, 1998 (DE) .......................... 198 56 300

(51) Int. Cl.⁷ ................ B60S 1/38; B60S 1/40
(52) U.S. Cl. ................ 15/250.201; 15/250.43; 15/250.32; 15/250.48
(58) Field of Search ............ 15/250.201, 250.43, 15/250.44, 250.32, 250.361, 250.453, 250.452, 250.451, 250.48

(56) References Cited

U.S. PATENT DOCUMENTS

| | | | | |
|---|---|---|---|---|
| 3,317,945 A | * | 5/1967 | Ludwig ................ | 15/250.43 |
| 6,279,191 B1 | * | 8/2001 | Kotlarski et al. ...... | 15/250.201 |
| 6,295,690 B1 | * | 10/2001 | Merkel et al. ......... | 15/250.201 |
| 6,449,797 B1 | * | 9/2002 | De Block ............. | 15/250.201 |

FOREIGN PATENT DOCUMENTS

| | | | | |
|---|---|---|---|---|
| DE | 1028896 | * | 4/1958 | ............ 15/250.43 |
| DE | 14 30 589 A | | 12/1968 | |
| DE | 1 505 357 | | 5/1969 | |
| DE | 15 05 397 A | | 10/1969 | |
| DE | 196 27 115 A | | 1/1998 | |
| EP | 0316114 | * | 5/1989 | ............ 15/250.43 |
| FR | 1239780 | * | 7/1960 | ............ 15/250.44 |
| FR | 2222855 | * | 10/1974 | ............ 15/250.43 |
| FR | 2222853 | * | 10/1994 | ............ 15/250.43 |
| GB | 1 429 820 A | | 3/1976 | |

* cited by examiner

*Primary Examiner*—Gary K. Graham
(74) *Attorney, Agent, or Firm*—Michael J. Striker

(57) ABSTRACT

A wiper blade (10) for windows of motor vehicles is proposed, which is equipped with an elastic, elongated support element for an elongated wiper strip (22), which strip comprises a flexible material and can be placed against the window (28) to be wiped with a wiper lip (30) and which on its long sides has opposed longitudinal grooves (34), in which spaced-apart longitudinal rails (32) of the support element (12) are located, which rails are secured in the grooves (34) by at least one retainer (36,38,40) that spans the spacing on the side of the support element (12) remote from the wiper lip (30). A spoiler (23) extends in the longitudinal direction of the support element, and for each retainer (36,38,40), the spoiler has a recess (46,48,50), which extends crosswise to the longitudinal direction of the wiper blade (10). The outer profile of the retainer is at least approximately adapted to the profile of the spoiler.

10 Claims, 5 Drawing Sheets

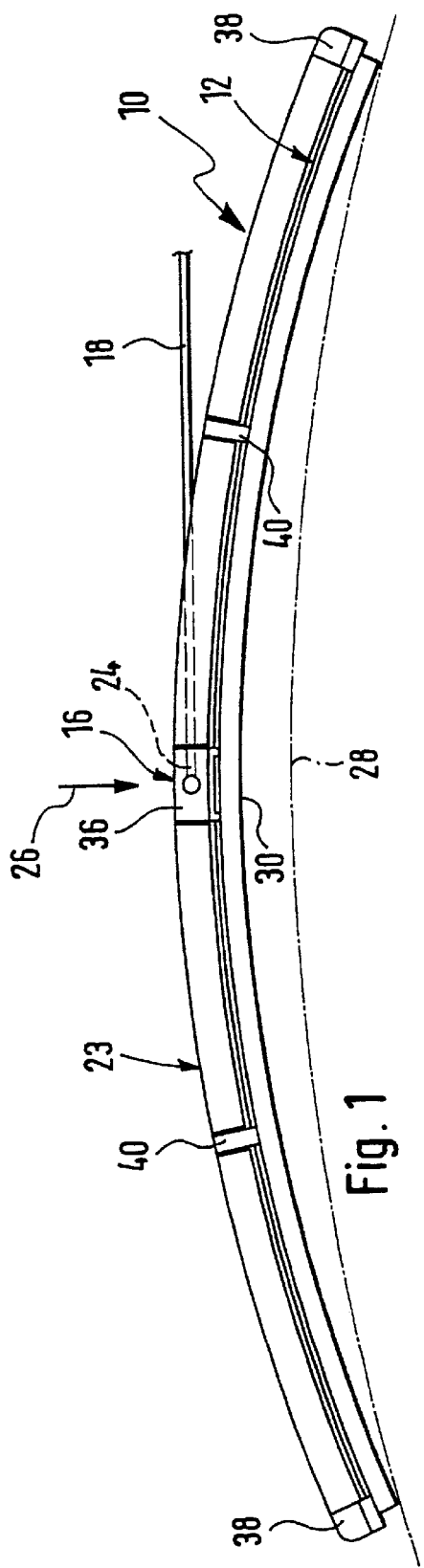
Fig. 1
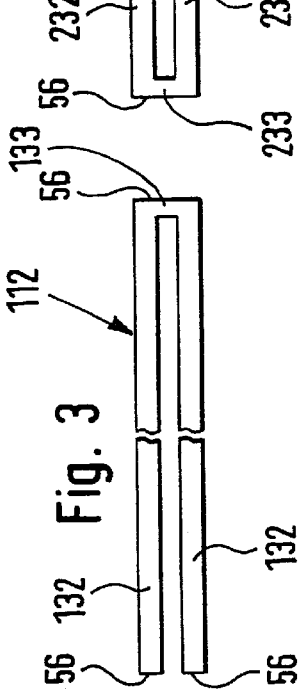
Fig. 4
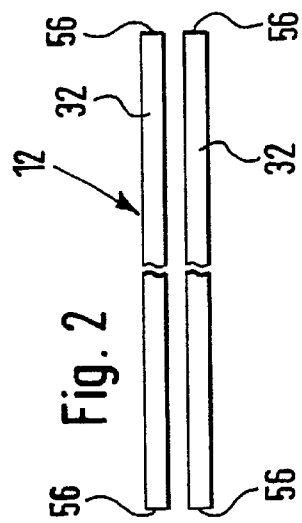
Fig. 3
Fig. 2

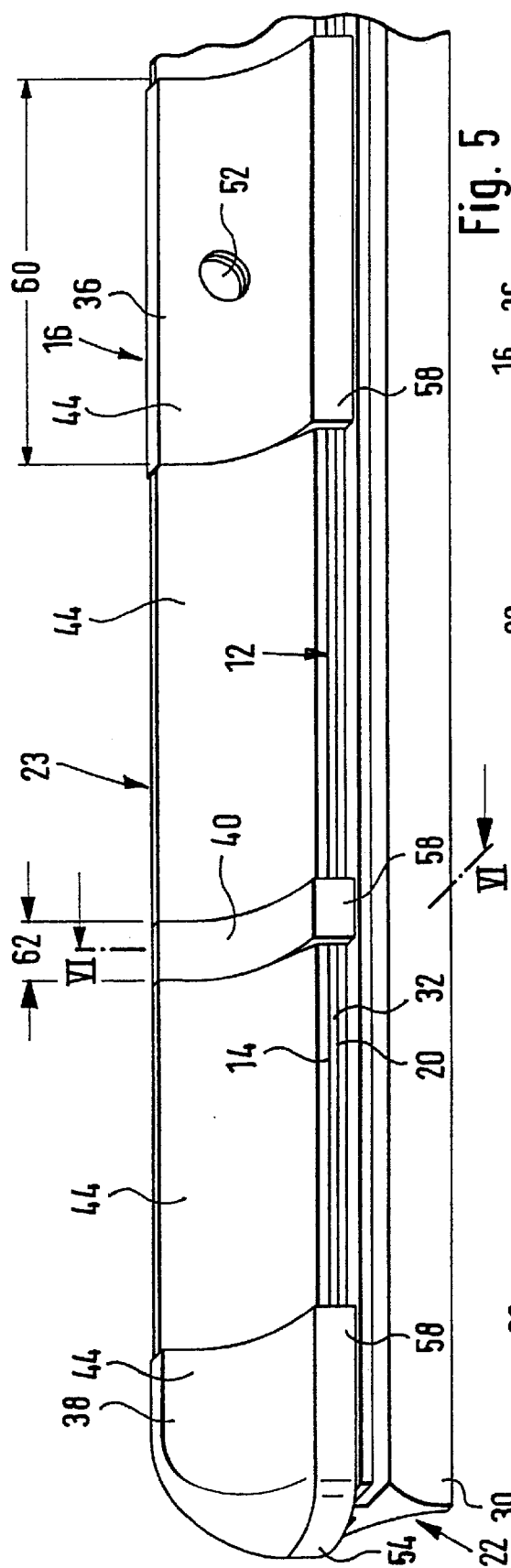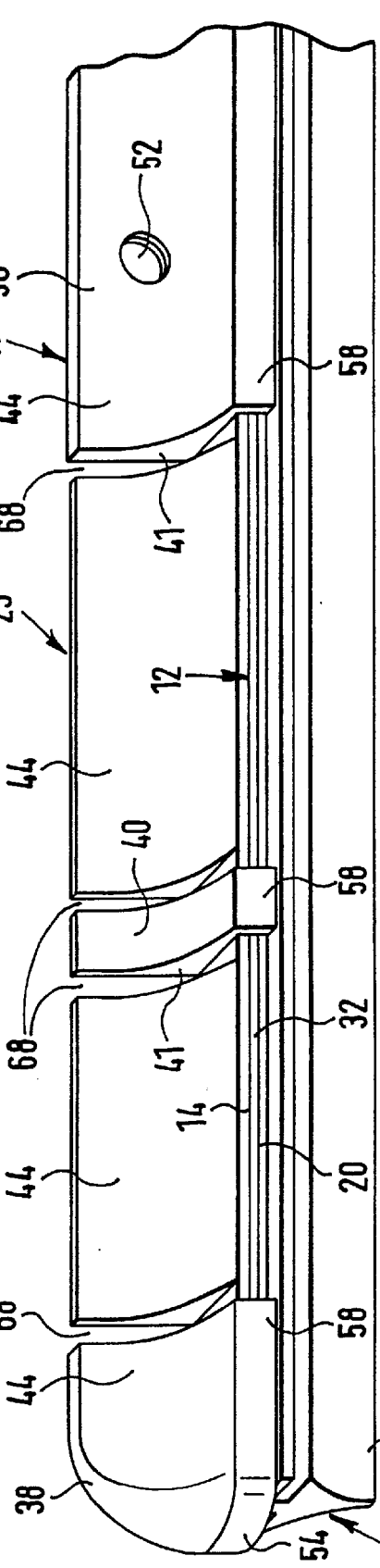

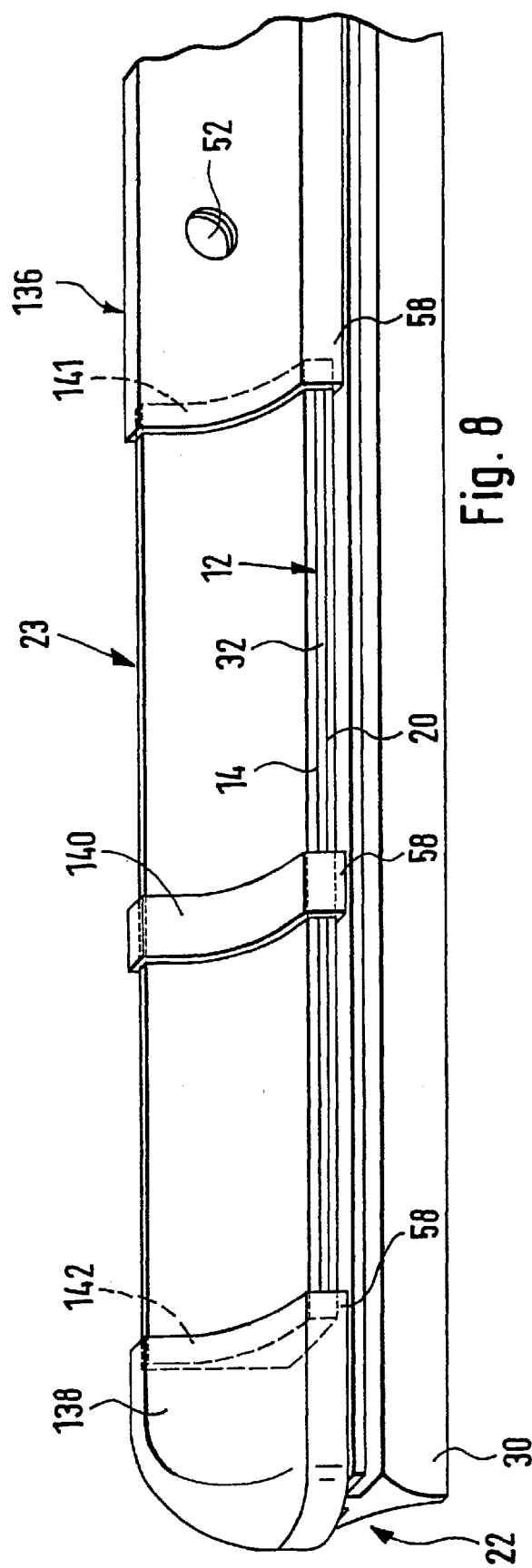
Fig. 8
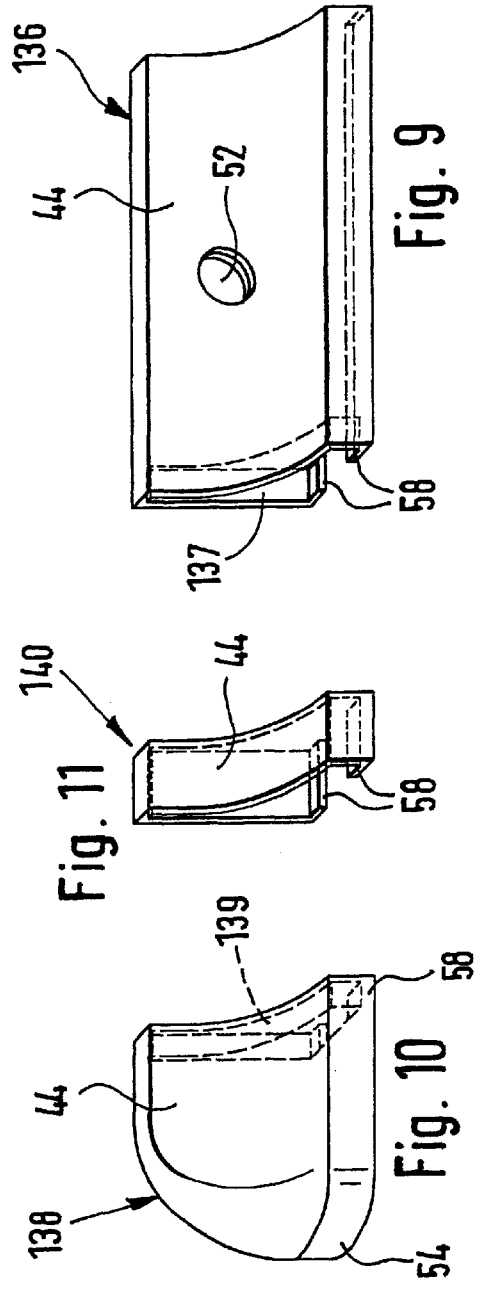
Fig. 9
Fig. 11
Fig. 10

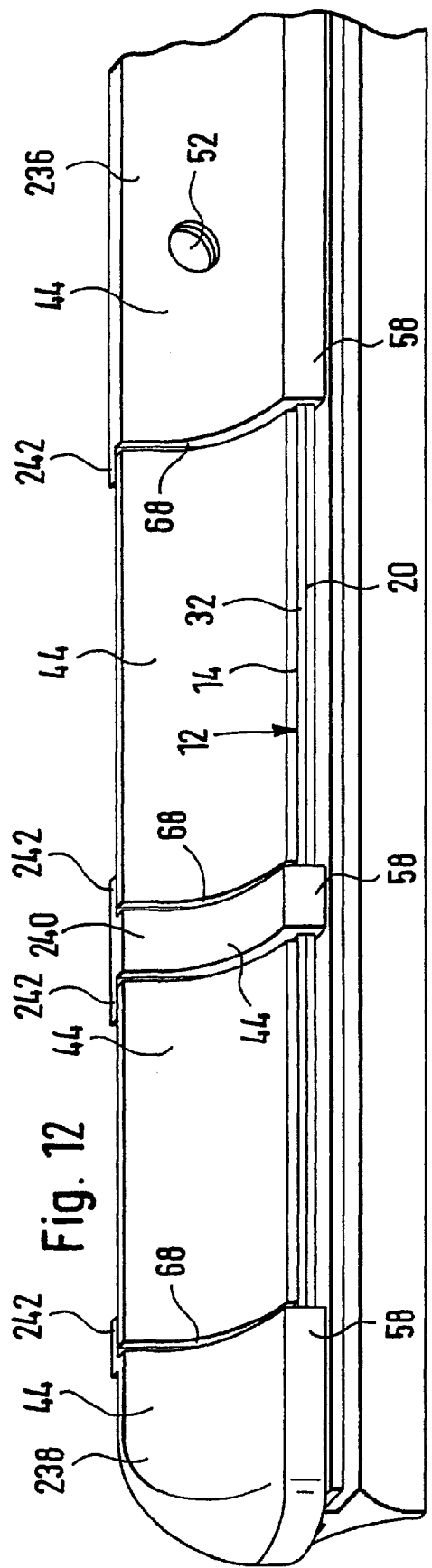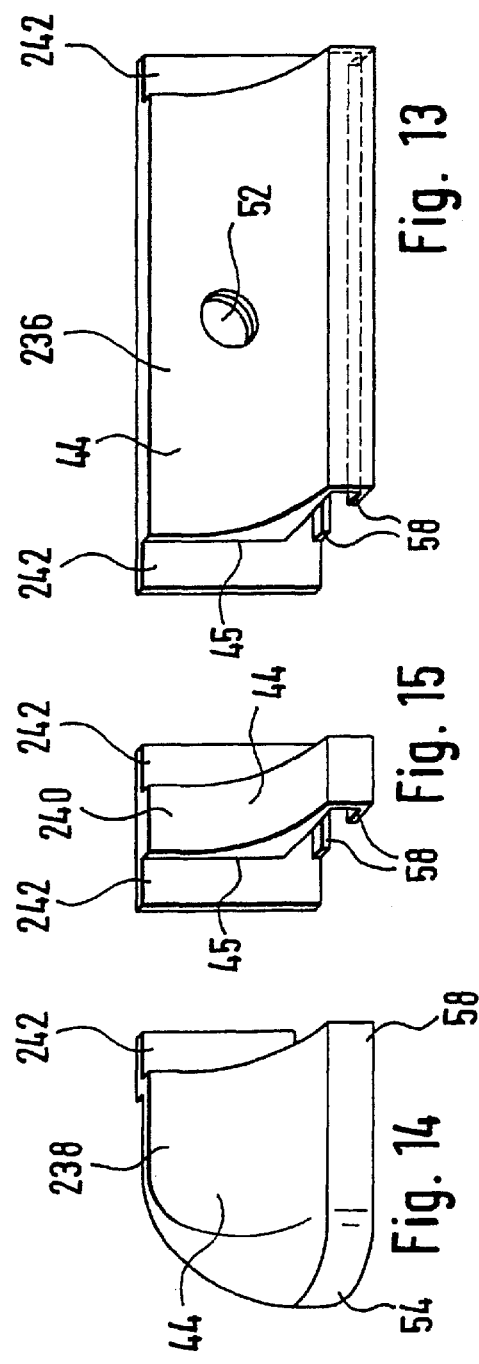

WIPER BLADE FOR WINDOW PANES OF MOTOR VEHICLES

BACKGROUND OF THE INVENTION

In wiper blades, the support element is intended to assure the most uniform possible distribution, over the entire field swept by the wiper blade, of the contact pressure of the wiper blade on the window, which pressure originates in the wiper arm. Because of an appropriate curvature of the unstressed support element —that is, when the wiper blade is not resting on the window—the ends of the wiper strip, which in wiper blade operation are placed fully against the window, are urged by the then-tensed support element toward the window, even if the radii of curvature of spherically curved vehicle windows differ in each wiper blade position. Accordingly, the curvature of the wiper blade has to be somewhat greater than the greatest curvature measured in the field to be swept of the window to be wiped. The support element thus replaces the complicated support bracket construction with two spring rails, disposed in the wiper strip, as they are used in conventional wiper blades (German patent disclosure DE-OS 15 05 357.)

The invention is based on a wiper blade as generically defined by the preamble to claim 1. In a known wiper blade of this type (DE 196 27 115.0 A1) must be provided with a separate wind repelling strip, or spoiler, if the tendencies of the wiper blade to lift away from the window at relatively high travel speeds are to be averted. If this spoiler is to be disposed on the side of the support element remote from the window, difficulties can arise in replacing the used wiper strip, at least whenever this replacement is done by the end user of the wiper blade. That is, this process requires not only the replacement of the wiper strip but further installation work with regard to the spoiler.

SUMMARY OF THE INVENTION

In the wiper blade according to the invention, as defined by the characteristics of the body of claim 1, it is possible for this spoiler to be formed integrally and economically onto the wiper strip; the recesses make an inconspicuous, problem-free placement of the retainers possible. Special installation steps for the spoiler are dispensed with. Because of the adaptation of the outer profile of the retainer to the profile of the spoiler, the spoiler remains operative over its full length, because no gaps that impair the contact pressure distribution remain. Even edges that occur at the recesses and can lead to an undesired reinforcement of the wind noise occurring in the wiper blade are covered by the retainers.

For attaching the wiper blade to a driven wiper arm, the retainer is disposed in the longitudinal middle portion of the support element and is provided with means for attaching a wiper arm of this kind.

To avoid the risk of injury from the sharp-edged ends of the longitudinal rails when a person is manipulating the wiper blade, at least one retainer is disposed on one end of the support element and is provided with means for covering the end edges of the longitudinal rails.

In the case of especially long wiper blades, it has proved advantageous if a further retainer is disposed between the retainer disposed in the longitudinal center portion and the retainer disposed on the end of the support element, because this prevents a portion of a longitudinal rail from snapping out of its longitudinal groove, with the attendant loss of wiping quality.

Simple securing of the longitudinal rails in their longitudinal grooves is attained if each retainer, with at least one kt, clasps a respective one of the two longitudinal rails on its longitudinal edges.

To lend the retainer the stability required during operation of the wiper blade, the groovelike recess, in the spoiler is filled by a body of the retainer, which body has the extension.

To achieve an attractive appearance of the wiper blade, in terms of the length of the wiper blade, the length of the retainer is adapted to the length of the groovelike recess.

Since in the course of time the material comprising the wiper strip and the spoiler integrally joined to it ages, which is associated with a certain shrinkage, air gaps can arise between the retainers and the end faces, toward them, of the spoiler portions; these gaps can lead to the disadvantages already mentioned in terms of appearance and noise reinforcement. In a refinement of the invention, this can be hindered by providing that the retainer is provided with a wall, which extends longitudinally of the wiper blade and which covers a peripheral region of the spoiler, adjacent to the recess, on the back wall on the spoiler, remote from the leading-edge face.

Another possible way of overcoming the above disadvantages is obtained if the body of the retainer, on its face end toward the recess wall of the spoiler, is provided with a recess, into which the spoiler plunges with a respective end piece.

Expediently, the retainer is made from a plastic.

Further advantageous refinements and features of the invention are disclosed in the ensuing description of exemplary embodiments, shown in the associated drawing.

BRIEF DESCRIPTION OF THE DRAWINGS

In the drawing:

FIG. 1 is a side view of a first embodiment of a wiper blade embodied according to the invention and attached to a driven wiper arm;

FIGS. 2–4 each show a plan view on variously embodied wiper blade support elements;

FIG. 5 is an enlarged perspective view of approximately half of the wiper blade of FIG. 1;

FIG. 7 shows the arrangement of FIG. 5 after ageing of the wiper strip and of the spoiler belonging to it;

FIG. 8, in a view corresponding to FIG. 5, shows another embodiment of the wiper blade of the invention;

FIG. 9 is a perspective view of a retainer, belonging to the wiper blade of FIG. 8 and embodied as a connection device;

FIG. 10 is a perspective view of a retainer, embodied for covering the longitudinal rail end edges, for the wiper blade of FIG. 8;

FIG. 11 is a perspective view of a retainer, disposed between the connection device and the end edges of the longitudinal rails, for the wiper blade of FIG. 8;

FIG. 12 is a view corresponding to FIG. 5 of a further embodiment of the wiper blade of the invention;

FIG. 13 is a perspective view of a retainer, embodied as a connection device and belonging to the wiper blade of FIG. 12;

FIG. 14 is a perspective view of a retainer, embodied for covering the end edges of the longitudinal rails, for the wiper blade of FIG. 12; and FIG. 15 is a perspective view of a retainer, disposed between the connection device and the end edges of the longitudinal rails, for the wiper blade of FIG. 12.

DESCRIPTION OF THE EXEMPLARY EMBODIMENTS

Figure 6:
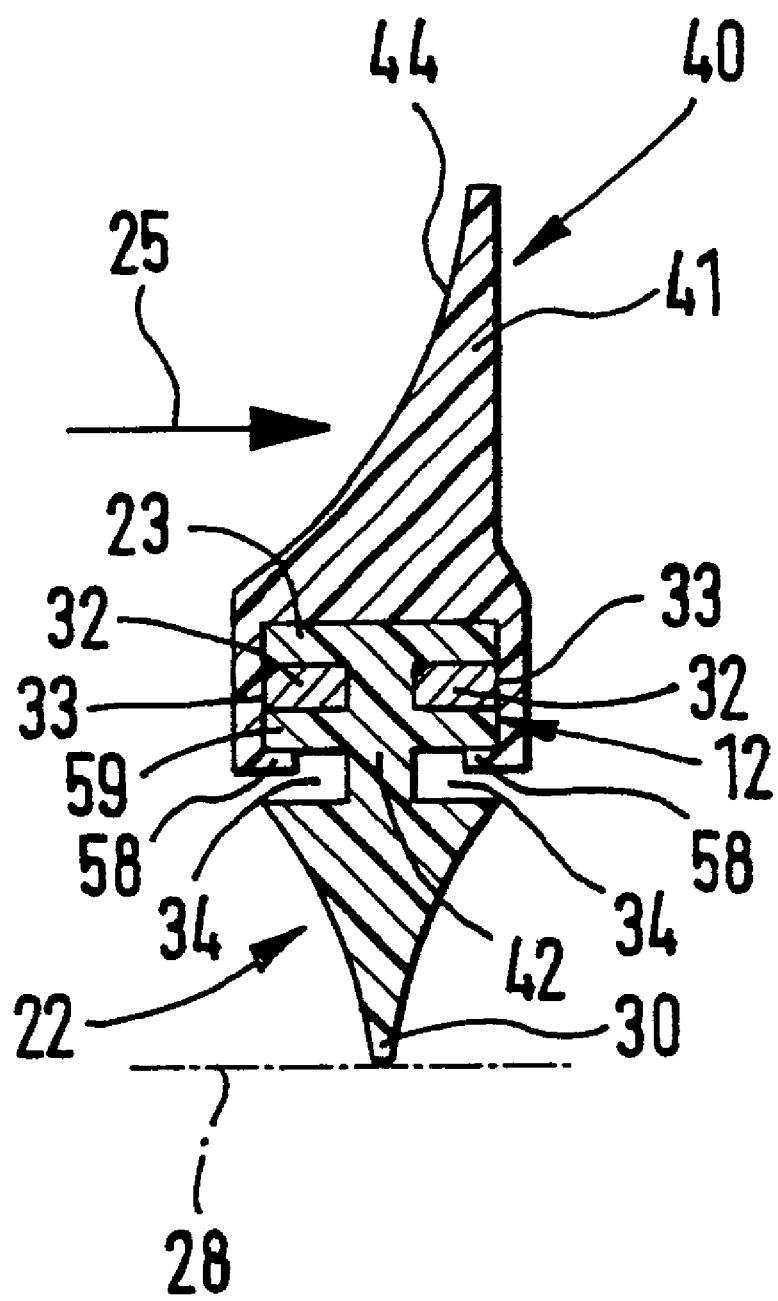
FIG. 6 shows a cross section through the wiper blade of FIG. 5 along the line VI—VI.

A wiper blade 10, shown in FIGS. 1, 5 and 6, for motor vehicle windows has a multi-part elongated, spring-elastic support element 12, which is shown separately in FIG. 2. On the top side 14 of the support element 12 pointing away from the window—whose surface to be wiped is identified by reference numeral 28—is a connection device 16, with the aid of which the wiper blade can be connected separably to a wiper arm 18 guided along the body of a motor vehicle. An elongated, rubber-elastic wiper strip 22 is disposed, parallel to the longitudinal axis of the support element 12, on the underside 20 of the support element 12 oriented toward the window. The free end 24 of the wiper arm 18 is provided with means known per se for separably connecting the wiper blade to the wiper arm. Corresponding counterpart connection means are provided on the connection device 16. The driven wiper arm 18, which can be moved between turning points, is urged in the direction of the arrow 26 toward the window to be wiped, whose surface to be wiped is represented in FIG. 1 by a dot-dashed line 28. Since the dot-dashed line 28 is intended to represent the greatest curvature of the window surface, it is clear that the curvature of the wiper blade 10, resting with both ends on the window but still unstressed, is greater than the maximum curvature of the window. Under the contact pressure (arrow 26), the wiper blade presses with its wiper lip 30, over the entire length thereof, against the window surface 28. In the process, a tension builds up in the bandlike, spring-elastic support element 12 that assures a proper contact of the wiper strip 22, or wiper lip 30, over its entire length with the motor vehicle window.

As FIGS. 2 and 6 clearly show, in the wiper blade of FIGS. 1, 5 and 6, the support element 12 is formed by two loose, spring-elastic longitudinal rails 32. However, it is also conceivable either to join these two longitudinal spring rails 132 to one another on one end via a crosspiece 133 (FIG. 3), or to dispose one crosspiece 233, 234 on each of the two ends of the longitudinal spring rails 232 (FIG. 4). With regard to the invention, the only significant aspect here is that the support element 12 (FIG. 2) or 112 (FIG. 3) or the support element 212 of FIG. 4, made preferably from spring band steel has two spaced-apart longitudinal rails 32, 132, and 232, respectively, which belong to the support element or form the support element (FIG. 2).

The special feature of a first embodiment of the wiper blade of the invention will now be described in further detail in conjunction with FIGS. 5 and 6 of the drawing—which essentially corresponds to the embodiment of FIG. 1. FIG. 6 is particular shows that the two longitudinal rails 32 belonging to the support element 12 rest in longitudinal grooves 34 of the wiper strip 22, which are located in a common plane located at a spacing distance from the surface to be wiped of the windshield 28. The longitudinal grooves 34 and thus the longitudinal rails 32 received in them are spaced apart from one another. To prevent these longitudinal rails 32 from being able to shift transversely to their length out of their longitudinal grooves 34, they are secured by a plurality of retainers, of which the first retainer 36 is disposed in the longitudinal middle portion of the support element 12. A further, second retainer 38 is disposed on each of the two ends of the support element 12, and a third retainer 40 is provided in each case between the first retainer and each second retainer 38 (FIGS. 1 and 5). As FIGS. 5–7 clearly show, the wiper strip 22 extends via a longitudinal strut 42, located between the longitudinal grooves 34, as far as the top side 14 of the support element 12 facing away from the window 28. This longitudinal extension 23, which extends longitudinally of the wiper strip 22 and adjoins the longitudinal strut 42 is embodied as a spoiler; that is, its side that during wiping operation is predominantly encountered by the relative wind (arrow 25 in FIG. 6) is equipped with a leading-edge throat 44. For the retainers 36, 38 and 40, the wiper strip 22, which also includes the spoiler 23, is provided, on its side of the support element 12 remote from the wiper lip 30, with recesses 46, 48, 50 oriented transversely to the length of the wiper strip 22; of these, the first recess 46 is associated with the first retainer 36, the second recess 48 with the second retainer 38, and the third recess 50 with the third retainer 40. The retainers 36, 38 and 40 span the spacing by which the two outer longitudinal edges 33 of the two longitudinal spring rails 32 are spaced apart by one another. FIG. 6 shows this in particular in terms of a third retainer 40, shown in cross section. In the region of the spoiler 23, the retainers 36–40 have a cross section that substantially coincides with the cross section of the spoiler 23. Each retainer is accordingly also provided with a leading-edge throat 44 against which the relative wind 25 blows. Seen in cross section, accordingly, each retainer 36–40 has a profile, in the region of the spoiler, that is at least approximately adapted to the profile of the spoiler. The profile is shaped in such a way that the spoiler, and thus the retainers 36, 38 and 40 located in the recesses 46, 48 and 50, meet the need of the spoiler for improving the performance of the wiper blade 10 in terms of lifting away from the window, even at high travel speeds. Accordingly each retainer 36, 38, 40, with its body 41, forms a filler piece that fills the recess 46, 48 and 50, respectively, associated with the respective retainer. As FIGS. 1 and 5 show in particular, the retainer 36 disposed in the longitudinal middle portion of the support element 12 is provided with means for attaching the wiper arm 18. In the exemplary embodiment, these means are formed by a transverse bore 52, into which a pivot bolt, for instance, can be placed, which is then engaged by the wiper arm with a counterpart pivot piece. The two retainers 40, each disposed on one of the ends of the support element 12, have a closing wall 54, which serves to cover the end edges 56 of the respective support elements 12, 112 and 212. All the retainers 36, 38, 40, on the side of the retaining body 41 oriented toward the support element 12, are provided with opposed securing claws 58 (FIG. 6), each of which clasps one of the two longitudinal rails 32, transversely to their length, on their longitudinal edges 33 remote from one another. It is indispensable that in the exemplary embodiment, each of the longitudinal rails is also covered by a longitudinal band 59 of the wiper strip 22 and of the longitudinal extension 23, respectively. The sole decisive factor is that the securing claws 58 fit over the outer longitudinal edges 33 of the spring rails 32 and secure them in their longitudinal grooves 34 of the wiper strip 22. Furthermore, the securing claws 58 also assure proper securing of each retainer 34, 36, 38 on the wiper strip 22 and thus also assure reliable positioning of each retainer on the wiper blade 10. In terms of the length of the wiper blade 10, the length 60 of the retainer 36 and the length 62 of the retainer 40 are adapted to the length of the associated groovelike recesses 46 and 50, respectively.

However, it has been found that when certain materials or mixtures of materials are used to produce the wiper strip 22 and the spoiler 23 integrally joined to it, a certain shrinkage ensues in the course of the ageing process, especially in the longitudinal direction of the wiper strip 22, and this can lead to the forming of gaps between the spoiler portions formed by the recesses 46, 48, 50 and the retainer bodies 41. Such a situation is shown in FIG. 7, taking as an example the exemplary embodiment of the invention shown in FIG. 5. The gaps between the spoiler portions and the retainer bodies 41 are identified by reference numeral 68. Aside from the unattractive appearance of such a wiper blade, these gaps 68 lead to considerable undesired noise of the wiper blade, which is highly irritating, especially at relatively high travel speeds.

In order to cover these gaps 68, the body of the retainer 136—in an exemplary embodiment of the invention shown in FIGS. 8–11—is provided on its face end toward the recess wall of the spoiler with a recess 137 (FIG. 9), into which the spoiler 23 plunges with an end piece 141 (FIG. 8). A corresponding arrangement is provided on the second retainer 138 as well, which is disposed on the ends of the wiper strip 22 or of the support element 12. The recess corresponding to the recess 137 is identified by reference numeral 139 in FIG. 10. FIG. 8 also illustrates the plunging of the end piece 142 into the recess 139. In this embodiment, the third retainer 140 is embodied in bandlike form. It wraps around the unsplit spoiler that extends between the two retainers 136 and 138. FIGS. 9–11 also show the securing claws 58, already mentioned, which clasp the two longitudinal rails 32 on their outer longitudinal edges 33.

A further embodiment, shown in FIGS. 12–15, shows another possible way of covering the gaps 68, which is employed between the facing end faces of the first retainer 236 and with the corresponding faces of the second retainer 238 and the spoiler, or the facing end faces of the third retainer 240 and the end faces, toward it, of the spoiler 23. To that end, the back walls 45, located on the back side of the leading-edge throat 44, of the respective retainers 236, 238, 240 are provided, on their peripheral regions adjacent to the respective recesses 46, 48, and 58 (FIG. 1), with a back wall 242 which extends far enough in the longitudinal direction of the wiper blade that a reliable covering of the gaps 68 is assured in every operating position of the wiper blade 10.

It is a common feature of all the exemplary embodiments that the wiper blade 10, on the top side of the support element 12 opposite the wiper lip 30, is provided with a spoiler 23, extending in the longitudinal direction of the support element, and this spoiler has one recess 46, 48 and 50 for each respective retainer 36, 38, and 40, the retainers preferably being made of a plastic, which extends crosswise to the longitudinal direction of the wiper blade 10, and when seen in cross section, the outer profile of the respective retainer, located in the region of the spoiler 23, is at least approximately adapted to the profile of the spoiler.

What is claimed is:

1. An elongated wiper blade (10) for windows of motor vehicles, having an elastic, elongated support element for an elongated wiper strip (22), which strip comprises a flexible material and can be placed against the window (28) to be wiped with a wiper lip (30) and which on its long sides has opposed longitudinal grooves (34), in which spaced-apart longitudinal rails (32) of the support element (12) are located, which rails are secured in the grooves (34) by at least one retainer (36, 38, 40) that spans a spacing between sides of the support element (12) remote from the wiper lip (30), characterized in that the wiper blade (10), on the side of the support element (12) opposite the wiper lip (30), is provided with a spoiler (23) having an outer profile, extending in the longitudinal direction of the support element, and for each retainer (34, 36, 38), the spoiler has a recess (46, 48, and 50, respectively) receiving said at least one retainer, which recess, extends crosswise to the longitudinal direction of the wiper blade (10), and in transverse cross section, an outer profile of the at least one retainer located in the region of the spoiler (23) is at least approximately adapted to the outer profile of the spoiler.

2. The wiper blade of claim 1, characterized in that the at least one retainer (36, 136, 236, respectively) is disposed in a longitudinal center portion of the support element (12) and is provided with means (52) for attaching a driven wiper arm (18).

3. The wiper blade of claim 2, characterized in that an additional retainer (38) is disposed on one end of the support element (12) and is provided with means (54) for covering end edges (56) of the longitudinal rails (32).

4. The wiper blade of claim 3, characterized in that a further retainer (40) is disposed between the retainer (36) disposed in the longitudinal center portion and the additional retainer (38) disposed on the end of the support element (12).

5. The wiper blade of claim 1, characterized in that each retainer (36, 38, and 40, respectively), with at least one claw (58), clasps a respective one of the two longitudinal rails (32) on a longitudinal edges (33).

6. The wiper blade of claim 5, characterized in that the at least one recess (46, 48, 50, respectively), in the spoiler (23), is groove-shaped and is filled by a body (41) of the at least one retainer.

7. The wiper blade of claim 6, characterized in that in terms of the length of the wiper blade (10), a length of the at least one retainer (60 w and 62) is adapted to a length of the groove-shaped recess (46 and 50, respectively).

8. The wiper blade of claim 7, characterized in that the at least one retainer (236, 238, 240) is provided with a wall (242), which extends longitudinally of the wiper blade (10) and which covers a peripheral region of the spoiler (23), adjacent to the recess, on a back wall on the spoiler, remote from a leading-edge face (44).

9. The wiper blade of claim 8, characterized in that the body (41) of the at least one retainer (136 and 138), on its face end toward a recess wall of the spoiler (23), is provided with a recess (137 and 139, respectively), into which the spoiler (23) plunges with a respective end piece (141 and 142).

10. The wiper blade of claim 1, characterized in that the at least one retainer (36, 38, 40; 136, 138, 140; 236, 238, 240) is made from a plastic.

* * * * *